United States Patent
Yu et al.

(10) Patent No.: US 12,205,005 B2
(45) Date of Patent: Jan. 21, 2025

(54) SAMPLED SOFTMAX WITH RANDOM FOURIER FEATURES

(71) Applicant: Google LLC, Mountain View, CA (US)

(72) Inventors: Xinnan Yu, Forest Hill, NY (US); Ankit Singh Rawat, New York, NY (US); Jiecao Chen, San Jose, CA (US); Ananda Theertha Suresh, New York, NY (US); Sanjiv Kumar, Jericho, NY (US)

(73) Assignee: GOOGLE LLC, Mountain View, CA (US)

( * ) Notice: Subject to any disclaimer, the term of this patent is extended or adjusted under 35 U.S.C. 154(b) by 1105 days.

(21) Appl. No.: 16/931,862

(22) Filed: Jul. 17, 2020

(65) Prior Publication Data

US 2021/0019654 A1     Jan. 21, 2021

Related U.S. Application Data

(60) Provisional application No. 62/876,408, filed on Jul. 19, 2019.

(51) Int. Cl.
*G06N 3/08* (2023.01)
*G06F 17/14* (2006.01)
(Continued)

(52) U.S. Cl.
CPC .......... *G06N 20/10* (2019.01); *G06F 17/142* (2013.01); *G06F 17/18* (2013.01);
(Continued)

(58) Field of Classification Search
CPC .......... G06N 20/10; G06N 3/08; G06N 3/084; G06N 20/00; G06N 3/044; G06N 3/045;
(Continued)

(56) References Cited

U.S. PATENT DOCUMENTS

| | | | |
|---|---|---|---|
| 2014/0214735 A1* | 7/2014 | Harik | G06N 5/04 706/12 |
| 2018/0114145 A1* | 4/2018 | Holtmann-Rice | G06N 20/10 |
| 2020/0104426 A1* | 4/2020 | Wu | G06N 20/00 |

OTHER PUBLICATIONS

Blanc, Guy, and Steffen Rendle. "Adaptive sampled softmax with kernel based sampling." International Conference on Machine Learning. PMLR (Year: 2018).*

(Continued)

*Primary Examiner* — John T Repsher, III
(74) *Attorney, Agent, or Firm* — DORITY & MANNING P.A.

(57) ABSTRACT

Systems and methods for low bias negative sampling of classes according to the sampled softmax method are described herein. The systems and methods can include training a machine-learned model for classifying inputs into one or more classes of a plurality of classes, each of the plurality of classes having an associated class embedding in a plurality of class embeddings. The systems and methods can include selecting, by the one or more computing devices, one or more negative classes from the plurality of classes based at least in part on a probability distribution approximating a softmax distribution, wherein the probability distribution is determined based at least in part on a Random Fourier Features map.

20 Claims, 7 Drawing Sheets

(51) Int. Cl.
  *G06F 17/18* (2006.01)
  *G06F 18/2431* (2023.01)
  *G06F 40/20* (2020.01)
  *G06N 3/084* (2023.01)
  *G06N 20/00* (2019.01)
  *G06N 20/10* (2019.01)
  *G06V 10/77* (2022.01)

(52) U.S. Cl.
  CPC .......... *G06F 18/2431* (2023.01); *G06F 40/20* (2020.01); *G06N 3/08* (2013.01); *G06N 3/084* (2013.01); *G06N 20/00* (2019.01); *G06V 10/7715* (2022.01)

(58) Field of Classification Search
  CPC .... G06F 17/142; G06F 17/18; G06F 18/2431; G06F 40/20; G06F 18/24317; G06V 10/7715
  See application file for complete search history.

(56) References Cited

OTHER PUBLICATIONS

Wang, Xinshao, et al. "Ranked list loss for deep metric learning." Published Mar. 18, 2019 (Year: 2019).*
Rahimi, Ali, and Benjamin Recht. "Random features for large-scale kernel machines." Advances in neural information processing systems 20 (Year: 2007).*
Cherian, Anoop, Piotr Koniusz, and Stephen Gould. "Higher-order pooling of CNN features via kernel linearization for action recognition." 2017 IEEE Winter Conference on Applications of Computer Vision (WACV) (Year: 2017).*
Agarwal et al., "Multi-Label Learning with Millions of Labels: Recommending Advertiser Bid Phrases for Web Pages", 22nd International World Wide Web Conference, May 13-17, 2013, Rio de Janeiro, Brazil, 11 pages.
Bengio et al., "Adaptive Importance Sampling to Accelerate Training of a Neural Probabilistic Language Model", IEEE Transactions of Neural Networks, vol. 19, No. 4, May 2008, 31 pages.
Blanc et al., "Adaptive Sampled Softmax with Kernel Based Sampling", 35th International Conference on Machine Learning, Jul. 10-15, 2018, Stockholm, Sweden, 10 pages.
Covington et al., "Deep Neural Networks for YouTube Recommendations", The ACM Conference on Recommender Systems, Sep. 15-19, 2016, Boston, MA, 8 pages.
De Brebisson et al., "An Exploration of Softmax Alternatives Belonging to the Spherical Loss Family", arXiv:1511.05042v1, Nov. 16, 2015, 9 pages.
Fagan et al., "Unbiased scalable softmax optimization", arXiv:1803.08577v1, Mar. 22, 2018, 26 pages.
Grave et al., "Efficient softmax approximation for GPUs", 34th International Conference on Machine Learning, Aug. 6-11, 2011, Sydney Australia, 9 pages.
Hamid et al., "Compact Random Features Maps", International Conference on Machine Learning, Jun. 21-26, 2014, Beijing, China, 9 pages.
Hyvarinen, "Estimation of Non-Normalized Statistical Models by Score Matching", Journal of Machine Learning Research vol. 6, 2005, pp. 695-708.
Jain et al., "Extreme Multi-label Loss Functions for Recommendation, Tagging, Ranking & Other Missing Label Applications", 22nd ACM SIGKDD International Conference on Knowledge Discovery and Data Mining, Aug. 13-17, 2016, San Francisco, CA, 10 pages.
Jean et al., "On Using Very Large Target Vocabulary for Neural Machine Translation", arXiv:1412.2007v1, Dec. 5, 2014, 10 pages.
Kar et al., "Random Feature Maps for Dot Product Kernels", 15th International Conference on Artificial Intelligence and Statistics, Apr. 21-23, 2012, La Palma, Canary Islands, pp. 583-591.
Krizhevsky et al., "ImageNet Classification with Deep Convolutional Neural Networks", Twenty-sixth Conference on Neural Information Processing Systems, Dec. 3-8, 2012, Lake Tahoe, Nevada, 9 pages.
Linguistic Data Consortium, "1996 English Broadcast News Speech (HUB4)", 1997, https://catalog.ldc.upenn.edu/LDC97S44, Retrieved on Jul. 19, 2021, 2 pages.
Linguistic Data Consortium, "Treebank-3 LDC99T42", 1999, https://catalog.ldc.upenn.edu/LDC99T42, Retrieved on Jul. 19, 2021, 2 pages.
Liu et al., "SphereFace: Deep Hypersphere Embedding for Face Recognition", IEEE Conference on Computer Vision and Pattern Recognition, Jul. 21-26, 2017, Honolulu, HI, pp. 212-220.
Manikvarma.org, "The Extreme Classification Repository: Multi-label Datasets & Code", http://manikvarma.org/downloads/XC/XMLRepository.html, retrieved on Jul. 16, 2021, 14 pages.
Mikolov et al., "Distributed Representations of Words and Phrases and their Compositionality", Twenty-seventh Conference on Neural Information Processing Systems, Dec. 5-10, 2013, Lake Tahoe, Nevada, 9 pages.
Mnih et al., "Learning word embeddings efficiently with noise-contrastive estimation", Twenty-seventh Conference on Neural Information Processing Systems, Dec. 5-10, 2013, Lake Tahoe, Nevada, 9 pages.
Morin et al., "Hierarchical Probabilistic Neural Network Language Model", 10th International Conference on Artificial Intelligence and Statistics, Jan. 6-8, 2005, Bridgetown, Barbados, 6 pages.
Mussmann et al., "Fast Amortized Inference and Learning in Log-linear Models with Randomly Perturbed Nearest Neighbor Search", arXiv:1707.03372v1, Jul. 11, 2017, 15 pages.
Pennington et al., "Spherical Random Features for Polynomial Kernels", Twenty-ninth Conference on Neural Information Processing Systems, Dec. 7-12, 2015, Montreal, Canada, 9 pages.
Rahimi et al., "Random Features for Large-Scale Kernel Machines", Advances in Neural Information Processing Systems, Dec. 8-10, 2008, Vancouver, Canada, 8 pages.
Raman et al., "DS-MLR: Exploiting Double Separability for Scaling up Distributed Multinomial Logistic Regression", arXiv:1604.04706. Apr. 16, 2016, 10 pages.
Ranjan et al., "L2-constrained Softmax Loss for Discriminative Face Verification", arXiv:1703.09507v3, Jun. 7, 2017, 10 pages.
Reddi et al., "Stochastic Negative Mining for Learning with Large Output Spaces", 22nd International Conference on Artificial Intelligence and Statistics, Apr. 16-18, 2019, Okinawa, Japan, 10 pages.
Schroff et al., "FaceNet: A Unified Embedding for Face Recognition and Clustering", IEEE Conference on Computer Vision and Pattern Recognition, Jun. 7-12, 2015, pp. 815-823.
Sriperumbudur et al., "Optimal Rates for Random Fourier Features", Twenty-ninth Conference on Neural Information Processing Systems, Dec. 7-12, 2015, Montreal, Canada, 9 pages.
Vembu et al., "Probabilistic Structured Predictors", 25th Conference on Uncertainty in Artificial Intelligence, Jun. 18-21, 2009, Montreal, Canada, pp. 557-564.
Vijayanarasimhan et al., "Deep Networks with Large Output Spaces", arXiv:1412.7479v2, Dec. 29, 2014, 9 pages.
Vincent et al., Efficient Exact Gradient Update for training Deep Networks with Very Large Sparse Targets, Twenty-ninth Conference on Neural Information Processing Systems, Dec. 7-12, 2015, Montreal, Canada, 9 pages.
Wang et al., "NormFace: L2 Hypersphere Embedding for Face Verification", 25th ACM International Conference on Multimedia, Oct. 23-27, 2017, Mountain View, CA, pp. 1041-1049.
Yang et al., "Quasi-Monte Carlo Feature Maps for Shift-Invariant Kernels", International Conference on Machine Learning, Jun. 21-26, 2014, Beijing, China, 9 pages.
Yen et al., "Loss Decomposition for Fast Learning in Large Output Spaces", Thirty-fifth International Conference on Machine Learning, Jul. 10-15, 2018, Stockholm, Sweden, 10 pages.
Yu et al., "Orthogonal Random Features", Thirtieth Conference on Neural Information Processing Systems, Dec. 5-10, 2016, Barcelona, Spain, 9 pages.

* cited by examiner

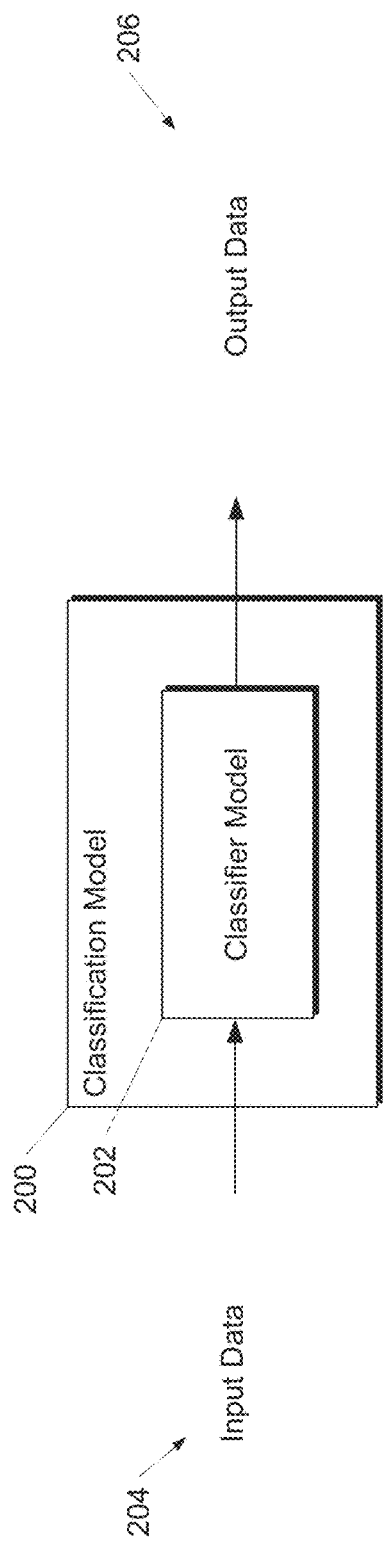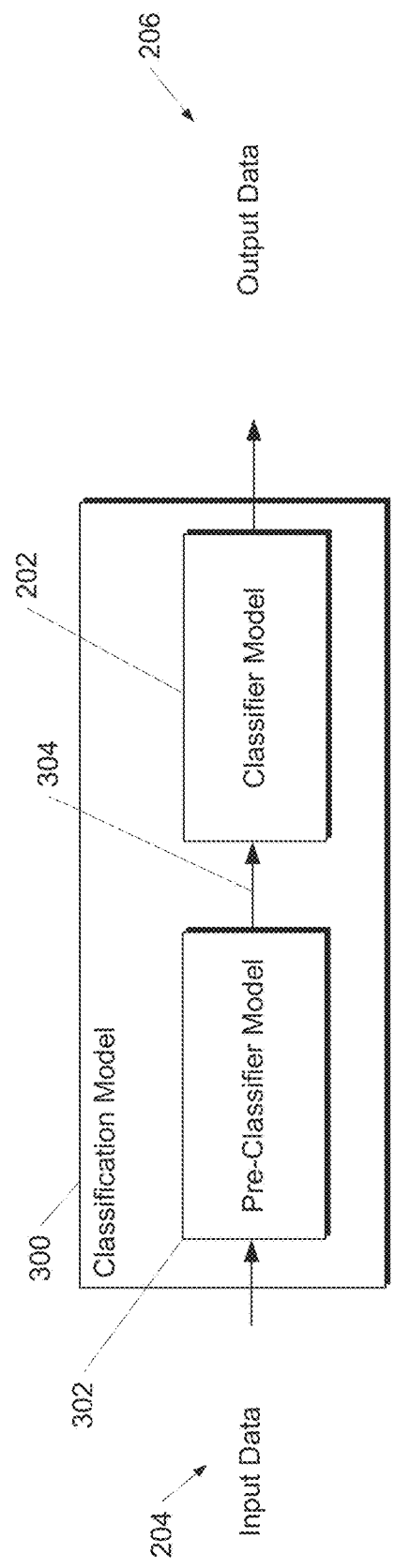

SAMPLED SOFTMAX WITH RANDOM FOURIER FEATURES

CROSS-REFERENCE TO RELATED APPLICATIONS

This application claims priority to and the benefit of United States Provisional Patent Application No. 62/876, 408 filed on Jul. 19, 2019, which is hereby incorporated by reference in its entirety.

FIELD

The present disclosure relates generally to systems and methods for training a machine-learned model. More particularly, the present disclosure relates to systems and methods for sampled softmax training of a machine-learned classification model utilizing a kernel that has been linearized using Random Fourier features and which provides an unbiased estimation of a softmax distribution.

BACKGROUND

Machine-learned models can be trained using the cross-entropy loss method or other loss functions. Cross-entropy loss measures the performance of a classification model whose output is a probability value, such as classification models used for classifying inputs into a number of classes. A method of training these models is to minimize the cross-entropy loss based on a softmax function. The computational cost of training using softmax cross-entropy loss can grow linearly with the number of classes.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of training a machine-learned model for classifying inputs into one or more classes of a plurality of classes, each of the plurality of classes having an associated class embedding in a plurality of class embeddings. In some embodiments, the method can include receiving, by one or more computing devices, one or more inputs and one or more labels. In some embodiments, the method can include determining, by the one or more computing devices, one or more input embeddings associated with the one or more inputs. In some embodiments, the method can include selecting, by the one or more computing devices, one or more negative classes from the plurality of classes based at least in part on a probability distribution approximating a softmax distribution, wherein the probability distribution is determined based at least in part on a Random Fourier Features map. In some embodiments, the method can include evaluating, by the one or more computing devices, a loss function to determine a loss based at least in part on the one or more negative classes, the one or more inputs, and the one or more labels. In some embodiments, the method can include adjusting, by the one or more computing devices, one or more parameters of the machine-learned model based at least in part on the loss associated with the one or more negative classes, the one or more inputs, and the one or more labels.

Another example aspect of the present disclosure is directed to a computing system including one or more processors and one or more non-transitory computer-readable media that collectively store a machine-learned model for multi-class classification. In some embodiments, the machine-learned model can be configured to receive one or more input features and assign a class of a plurality of classes to each of the one or more input features. In some embodiments, the one or more non-transitory computer-readable media can store instructions that, when executed by the one or more processors, cause the computing system to perform operations. In some embodiments, the instructions can include inputting the one or more input features into the machine-learned model and receiving the class as an output of the machine-learned model.

In some embodiments, the machine-learned model can be trained by receiving one or more training inputs and one or more labels, computing one or more input embeddings associated with the one or more training inputs, selecting one or more negative classes from the plurality of classes based at least in part on a probability distribution approximating a softmax distribution, wherein the probability distribution is determined based at least in part on a Random Fourier Features map, determining, based on the plurality of training inputs and the one or more labels, a loss associated with the one or more negative classes, and adjusting one or more parameters of the machine-learned model based at least in part on the loss associated with the one or more negative classes.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts a block diagram of an example classification model according to example embodiments of the present disclosure.

FIG. 3 depicts a block diagram of an example classification model according to example embodiments of the present disclosure.

Figure 1A:
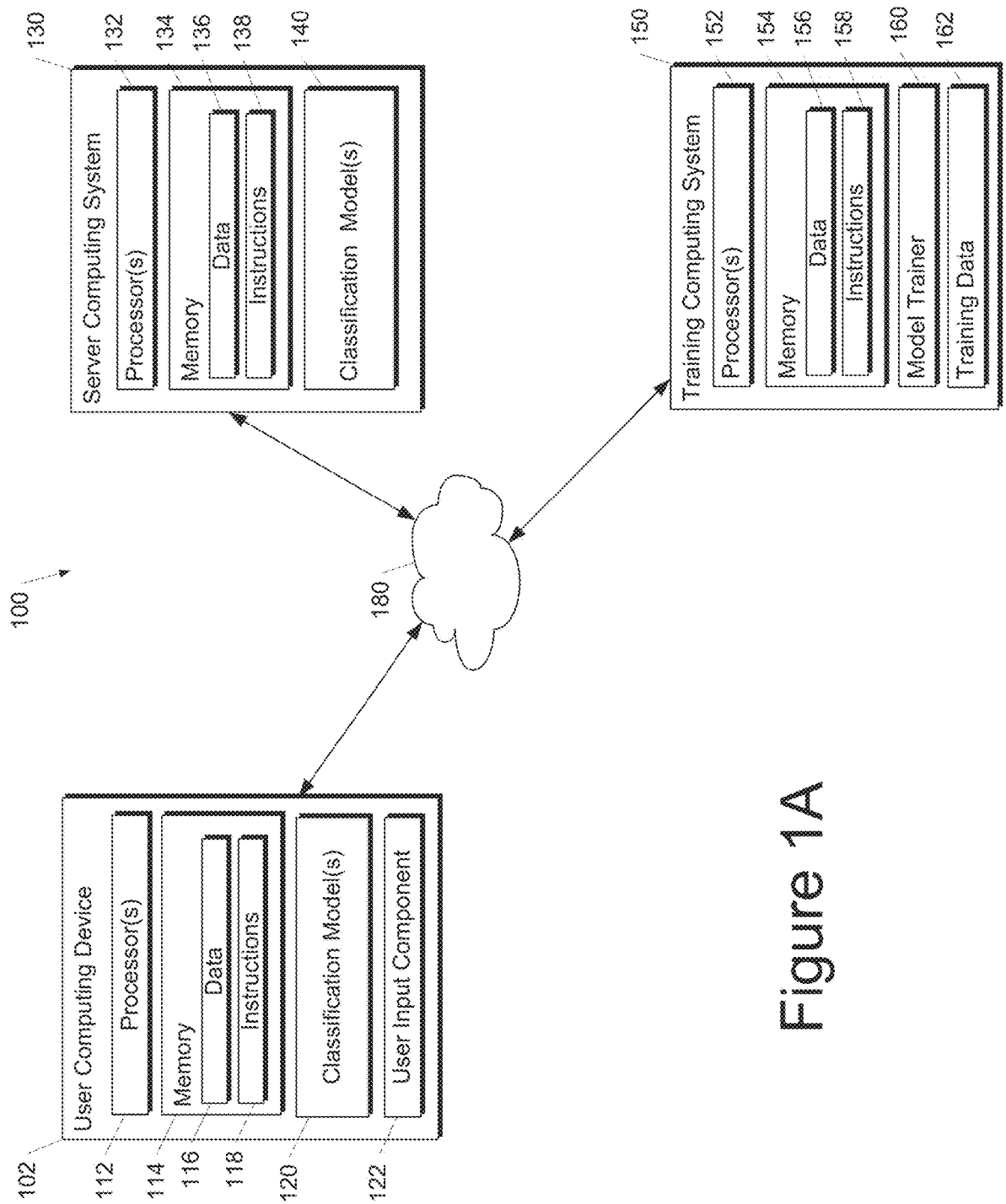
FIG. 1A depicts a block diagram of an example computing system that performs multi-class classification according to example embodiments of the present disclosure.

Reference numerals that are repeated across plural figures are intended to identify the same features in various implementations.

DETAILED DESCRIPTION

Overview

Generally, the present disclosure is directed to machine learning training through softmax cross-entropy loss. For instance, cross-entropy loss based on the softmax function can be used in multi-class classification tasks such as natural language processing, image classification, and recommendation systems. In multi-class classification, given an input $x \in \chi$, the goal is to predict the output class $t \in \{1, 2, \ldots, n\}$, where n is the number of classes. Given an input feature x, a model (e.g. a neural network) can compute an input embedding $h \in \mathbb{R}^d$, where d is an embedding dimension. Additionally, the model can compute raw scores or logits for classes $o=(o_1, \ldots, o_n)$. For instance, the logits can be the product of the input embedding h and the class embedding $c_1, \ldots, c_n \in \mathbb{R}^d$ according to $o_i = \tau h^T c_i$, where $\tau$ is often referred to as the temperature parameter of softmax or inverse temperature parameter of softmax.

The probability that the model assigns to the i-th class can be computed using the full softmax function $$p_i = \frac{e^{o_i}}{Z},$$

where $Z = \sum_{i=1}^{n} e^{o_i}$ is called the partition function. The distribution in the full softmax function is referred to as the softmax distribution. Given a collection of inputs and their true labels, the objective is to identify the model parameters by minimizing the cross-entropy loss based on the softmax function or the full softmax loss $\mathcal{L} = -\log p_t = -o_t + \log Z$, where $t \in [n]$ denotes the true label or true class for the input x.

First order optimization methods can be used to train neural network models. For instance, one example optimization method involves computing the gradient of the loss with respect to the model parameter(s) $\theta$ during each iteration. Computing the gradient of the full softmax loss can take $\mathcal{O}(dn)$ time due to the contributions from all n classes. Therefore, training a model using the full softmax loss can be prohibitively expensive in the settings where a large number of classes are involved.

For cases where a large number of classes are involved, one method to speed up training is to sample a subset of classes and utilize an estimate of the gradient based on these classes. This is referred to as the sampled softmax method. For instance, according to the sampled softmax method, instead of including all classes during each iteration, a small random subset of n classes is considered, where each of the n classes is sampled with some probability. These are referred to as negative classes.

Formally, let the number of sampled classes during each iteration be m, with class i being picked with probability $q_i$. Let $\mathcal{N}_t \triangleq [n] \setminus \{t\}$ be the set of negative classes. Assuming that $s_1, \ldots, s_m \in \mathcal{N}_t$ denote the sampled class indices, adjusted logits $o' = (o'_1, o'_2, \ldots, o'_{m+1})$ can be defined such that $o'_1 = o_t$ and for $i \in [m]$, $o'_{i+1} = o_{s_i} - \log(mq_{s_i})$. Accordingly, the sampled softmax distribution can be defined as $$p_{i'} = \frac{e^{o_{i'}}}{Z'},$$

where $Z' = \sum_{j=1}^{m+1} e^{o_{j'}}$. The sampled softmax loss can correspond to the cross entropy loss with respect to the sampled softmax distribution: $\mathcal{L} = -\log p'_t = -o_t + \log Z'$. Since the cross entropy loss with respect to the sampled softmax distribution depends only on m+1 classes, the computational cost can be reduced from $\mathcal{O}(dn)$ to $\mathcal{O}(dm)$ as compared to the full softmax loss.

However, the sampled softmax method can provide a biased estimate of the gradient if the samples are not drawn according to the exact softmax distribution, which can be expensive to compute. One approach to this problem is to sample from a simpler distribution in the hope of approximating the exact softmax distribution. For example, the negative classes may be drawn according to a uniform distribution, log-uniform distribution, or the global prior of classes. However, since these distributions do not approximate the full softmax distribution, they can lead to significantly worse solutions.

In order for the sampled softmax method to converge to the same solution, the gradient of the sampled softmax loss must be an unbiased estimator of the gradient of the full softmax loss, i.e. $\mathbb{E}[\nabla_\theta \mathcal{L}'] = \nabla_\theta \mathcal{L}$, where the expectation is taken over the sampling distribution q. This can hold if the sampling distribution q is the full softmax distribution itself, i.e., $q_i = p_i \propto e^{o_i}$. However, sampling from the softmax distribution itself can be computationally expensive. For instance, it can be necessary to compute the partition function Z during each iteration, which can be an $\mathcal{O}(dn)$ operation since Z can depend on both current model parameter and input.

One example aspect of the present disclosure is directed to systems and methods for low bias negative sampling of classes according to the sampled softmax method utilizing a sampling probability distribution that accurately estimates the full softmax distribution. The use of Random Fourier features in the sampling probability distribution can enable more efficient and accurate sampling from an approximated softmax distribution. Systems and methods according to the present disclosure can enable low bias in estimation in terms of both the full softmax distribution and the full softmax gradient. Furthermore, the cost of evaluating systems and methods according to the present disclosure can scale only logarithmically with the number of classes while closely approximating the softmax method.

A technical effect according to example aspects of the present disclosure is to provide a method of training a machine-learned model that requires fewer computational resources than the full softmax cross-entropy method. For instance, the complexity of sampling one class for systems and methods according to the present disclosure can be $\mathcal{O}(D \log n)$, where D denotes the number of random features used to define the Random Fourier features. Alternative methods often achieve a complexity of sampling one class of $\mathcal{O}(d^2 \log n)$. Here, d denotes the embedding dimension, which can be used in evaluating performance of similar methods, especially the square of d. In many cases, D can be orders of magnitudes smaller than $d^2$ to achieve similar or better performance. As a result, the systems and methods according to the present disclosure can allow for better computational efficiency due to low sampling cost. Such improved computational efficiency can result in the conservation of computing resources (e.g., processor usage, memory usage, network bandwidth, etc.). Thus, through use of the techniques proposed herein, a comparable machine-learned model can be trained faster and/or with reduced consumption of computing resources.

Another technical effect according to aspects of the present disclosure is to provide more accurate sampling of negative classes than a sampled softmax method using other sampling distributions. For instance, in order for the sampled softmax method to converge to the same solution, the gradient of the sampled softmax loss must be an unbiased estimator of the gradient of the full softmax loss. By sampling from a probability distribution that closely approximates the softmax distribution, it is possible to achieve limited to no bias in the sampled gradient, especially when compared to a probability distribution that is selected arbitrarily.

In some embodiments, systems and methods according to the present disclosure can employ kernel-based sampling. For instance, given a kernel $K: \mathbb{R}^d \times \mathbb{R}^d \to \mathbb{R}$, the input embedding $h \in \mathbb{R}^d$, and the class embeddings $c_1, \ldots, c_n \in \mathbb{R}^d$, kernel-based sampling selects the class i with probability $$q_i = \frac{K(h, c_i)}{\sum_{j=1}^{n} K(h, c_j)}.$$

The kernel can be linearized by a mapping $\phi: \mathbb{R}^d \to \mathbb{R}^D$ such that $K(h, c_i) = \phi(h)^T \phi(c_i)$. Accordingly, sampling one point from the distribution can take only $\mathcal{O}(D \log n)$ time, for instance if the sampling is performed by a divide-and-conquer algorithm.

In general, linearizable kernels can provide relatively low computational cost for sampling methods. As such, a linearizable kernel that provides a good uniform multiplicative approximation of the exponential kernel $K(h, c) = e^o = e^{\tau h^T c}$ is desirable in some embodiments. In other words, a nonlinear map $\phi(\cdot): \mathbb{R}^d \to \mathbb{R}^D$ such that the error between $K(h, c)$ and $\hat{K}(h, c) = \phi(h)^T \phi(c)$ is small, for all values of h and c, is desirable in some embodiments.

According to example aspects of the present disclosure, Random Fourier features can provide the linearizable kernel. However, the Random Fourier features method works primarily for positive definite shift-invariant kernels such as the Gaussian kernel. While it can be desirable to approximate the exponential kernel, the exponential kernel is not shift-invariant.

A solution to this problem is that when the input embedding h and class embedding c are normalized, the exponential kernel can be analogous to the Gaussian kernel up to a multiplicative constant. In other words, $$e^{\tau h^T c} = e^\tau e^{-\frac{\tau \|h - c\|_2^2}{2}}.$$

The normalization can maintain the expressive power of softmax as it can lose only one degree of freedom. In particular, the normalization can attain improved performance if $\tau$ is large enough to ensure that the output of softmax can cover about the entire range (0,1).

For instance, for a Gaussian kernel $$K(x - y) = e^{-\frac{v\|x-y\|^2}{2}}$$

with temperature parameter $v$, a D-dimensional Random Fourier features (RFF) map can be defined as:

$$\phi_{\frac{1}{\sqrt{v}}, D}(u) = \frac{1}{\sqrt{D}} \left[ \cos(w_1^T u), \ldots, \cos(w_D^T u), \sin(w_1^T u), \ldots, \sin(w_D^T u) \right],$$

where $w_1, \ldots, w_D \sim N(0, I/v)$. The RFF map provides an unbiased approximation of Gaussian kernel $$e^{-\frac{v\|x-y\|^2}{2}} \approx \phi_{\frac{1}{\sqrt{v}}, D}(x)^T \phi_{\frac{1}{\sqrt{v}}, D}(y).$$

Given input embedding h, if class i is sampled with probability $q_i \propto \exp(-\tau \|c_i - h\|^2 / 2)$, then it follows that the sampling distribution is the same as the softmax distribution. Therefore, with normalized embeddings, the kernel-based sampling can realize the sampled softmax such that class i is sampled with the probability $$q_i \propto \phi_{\frac{1}{\sqrt{v}}, D}(c_i)^T \phi_{\frac{1}{\sqrt{v}}, D}(h).$$

probability thus can provide a completely unbiased approximation of the desired exponential softmax kernel if D is infinite and $v = \tau$. In some cases, this is not feasible, and it can be necessary to select a finite D and/or $v$ empirically to provide as close of an approximation as possible given the finite D.

Figure 4:
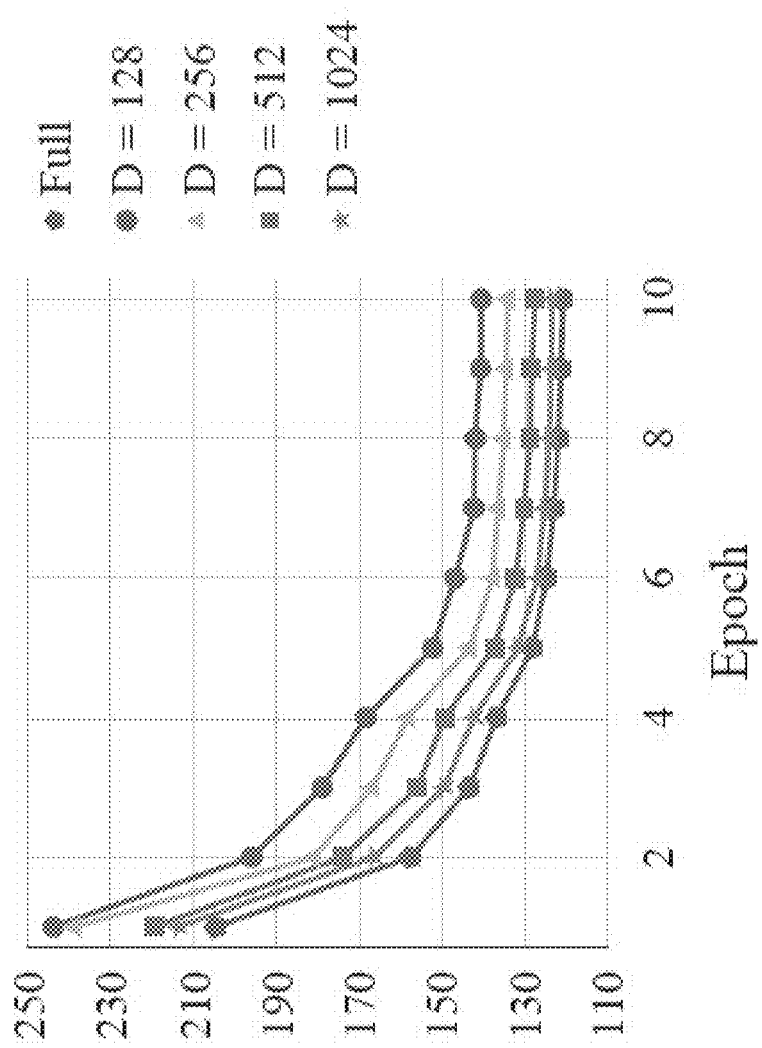
FIG. 4 depicts performance of an example classification model according to example embodiments of the present disclosure as a mapping dimension is varied.

The accuracy of the approximation of the Gaussian kernel using the RFF map generally improves as the mapping dimension D is increased. For example, FIG. 4 shows the performance of an example embodiment of the present disclosure on an example training set for different values of D as compared to a baseline (full softmax). As illustrated, the performance of the example embodiment of the present disclosure approaches that of the full softmax as D increases.

When selecting the temperature parameter $v$ it is noted that as long as $$e^{2v} \leq \frac{\gamma_1}{\rho \sqrt{d}} \cdot \frac{\sqrt{D}}{\log D},$$

it holds with probability at least $$1 - \mathcal{O}\left(\frac{1}{D^2}\right) \text{ that } e^{(\tau - v)h^T c_i} \cdot (1 - \gamma_2) \leq \frac{1}{\Sigma_{i \in N_t} e^{o_i}} \cdot \left|\frac{e^{o_i}}{q_i}\right| \leq e^{(\tau - v)h^T c_i} \cdot (1 + \gamma_2),$$

where $\gamma_1, \gamma_2$, and $\rho$ are positive constants. With large enough D such that $$e^{2\tau} \leq \frac{\gamma_1}{\rho\sqrt{d}} \cdot \frac{\sqrt{D}}{\log D},$$

$v=\tau$ can be selected. In particular, at $D=\infty$, $q_i \propto p_i$, or in other words the sampling distribution according to example aspects of the present disclosure provides an exact approximation of the exponential kernel.

One objective of systems and methods according to the present disclosure can be to obtain a computationally efficient estimate of the true gradient $\nabla_{74} \mathcal{L}$ of the full softmax loss with small bias. In some cases, ensuring small bias can be more important than ensuring small variance. For instance, a large variance can have relatively fewer adverse effects on the final quality of the trained model than a large bias. For instance, sampling distribution for which the bias is nonexistent can be desirable. In particular, an approximation $q_i$ can desirably provide a tight uniform multiplicative approximation of $e^{o_i}$.

However, the ability of q to approximate p can degrade as the difference $|\tau-v|$ increases. Therefore, while it may be desirable to pick $v$ to be as close to $\tau$ as possible, for the fixed dimension of the feature map D, the approximation guarantee in the above equation can hold for only those values of $v$ that are bounded by a function of D. Therefore, the dimension of the Random Fourier feature map D can influence which Gaussian kernels can be effectively utilized in accordance with the present disclosure. Additionally, the variance of the kernel approximation according to the Random Fourier feature technique can grow with $v$. Thus, selecting $v=\tau$ can result in an overly large value for the temperature parameter $\tau$ such that the approximation no longer holds. Therefore, choosing $v=\tau$ in this case will result in larger variance of the estimated kernel. Thus, as a tradeoff between bias and variance on approximating the exponential kernel, with a limited D and large $\tau$, $v$ can be set as a value smaller than $\tau$ to achieve a more accurate kernel.

Figure 5:
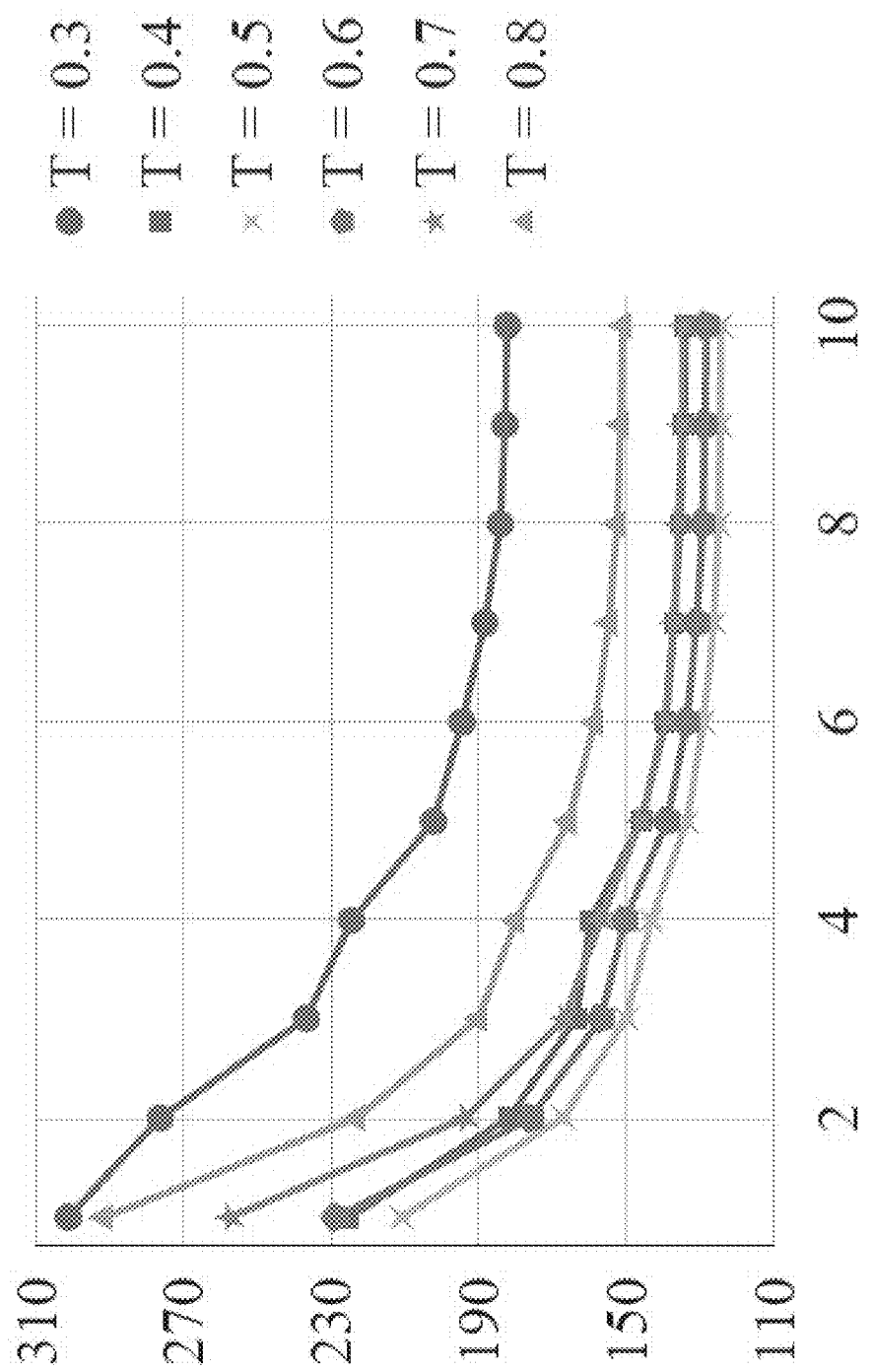
FIG. 5 depicts performance of an example classification model according to example embodiments of the present disclosure as a temperature parameter is varied.

In some embodiments, the temperature parameter $v$ is evaluated empirically. For instance, a graph of model accuracy for varying $T=1/\sqrt{\tau}$ according to one example embodiment of the present disclosure is given in FIG. 5. For instance, the example embodiment of FIG. 5 includes a mapping dimension D of 1024 and a number of sampled classes during each iteration m of 100. In FIG. 5, a lower value at the ordinate represents a more accurate data point. As depicted, the choice of T=0.5 in the example embodiment of FIG. 5 provides the best performance. Other suitable methods of evaluating the temperature parameter can be employed in accordance with the present disclosure.

According to the equation $$q_i \propto \phi_{\frac{1}{\sqrt{v}},D}(c_i)^T \phi_{\frac{1}{\sqrt{v}},D}(h),$$

the time taken to sample one point is $\mathcal{O}(D \log n)$. Computing a nonlinear map according to this equation can thus be performed in $\mathcal{O}(Dd)$ time. In some embodiments, the structured orthogonal random feature (SORF) technique can be used to reduce this complexity to $\mathcal{O}(D \log d)$ with even lower approximation error. Because the embedding dimension d can be on the order of hundreds and n can be large such that $d \ll n$, the overall complexity of training can thus be considered as $\mathcal{O}(D \log n)$.

One example method of generating embeddings is now discussed. For each data point of a $v$-dimensional (sparse) feature, a $v \times 128$ matrix with normalized rows can be applied to map the feature to a 128-dimensional vector (d=128). Once normalized, this vector can serve as the input embedding h. For classes $i \in [n]$, class i can similarly be mapped to a 128-dimensional normalized vector $c_i$.

Example Devices and Systems

FIG. 1A depicts a block diagram of an example computing system 100 that performs multi-class classification according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more classification models 120. For example, the classification models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example classification models 120 are discussed with reference to FIGS. 2 and 3.

In some implementations, the one or more classification models 120 can be received from the server computing system 130 over network 180, stored in the user computing device memory 114, and then used or otherwise implemented by the one or more processors 112. In some implementations, the user computing device 102 can implement multiple parallel instances of a single classification model 120 (e.g., to perform parallel classification across multiple instances of related and/or unrelated input features).

More particularly, the one or more classification models 120 are configured to receive one or more input features. The one or more classification models 120 predict an output class out of a plurality of output classes most closely associated with each of the one or more input features. For example, the one or more classification models 120 may perform natural language processing. As another example, the one or more classification models 120 may perform image classification. As another example, the one or more classification models 120 may perform content recommendation. The one or more classification models 120 may be configured to perform any suitable task in accordance with the present disclosure.

Additionally or alternatively, one or more classification models 140 can be included in or otherwise stored and implemented by the server computing system 130 that communicates with the user computing device 102 according to a client-server relationship. For example, the classification models 140 can be implemented by the server computing system 140 as a portion of a web service (e.g., a multi-class classification service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned classification models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 and 3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the classification models 120 and/or 140 based on a set of training data 162. The training data 162 can include, for example, pairs of input features and associated class labels. For example, the input features may include features used for natural language processing, such as raw or processed linguistic information. As another example, the input features may include image classification features, such as raw or processed images. As another example, the input features may include features used for content recommendation services, such as web usage or other suitable information. The input features can have associated labels. For example, the labels may be indicative of a desired aspect of training, such as a true class associated with some or all of the input features.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
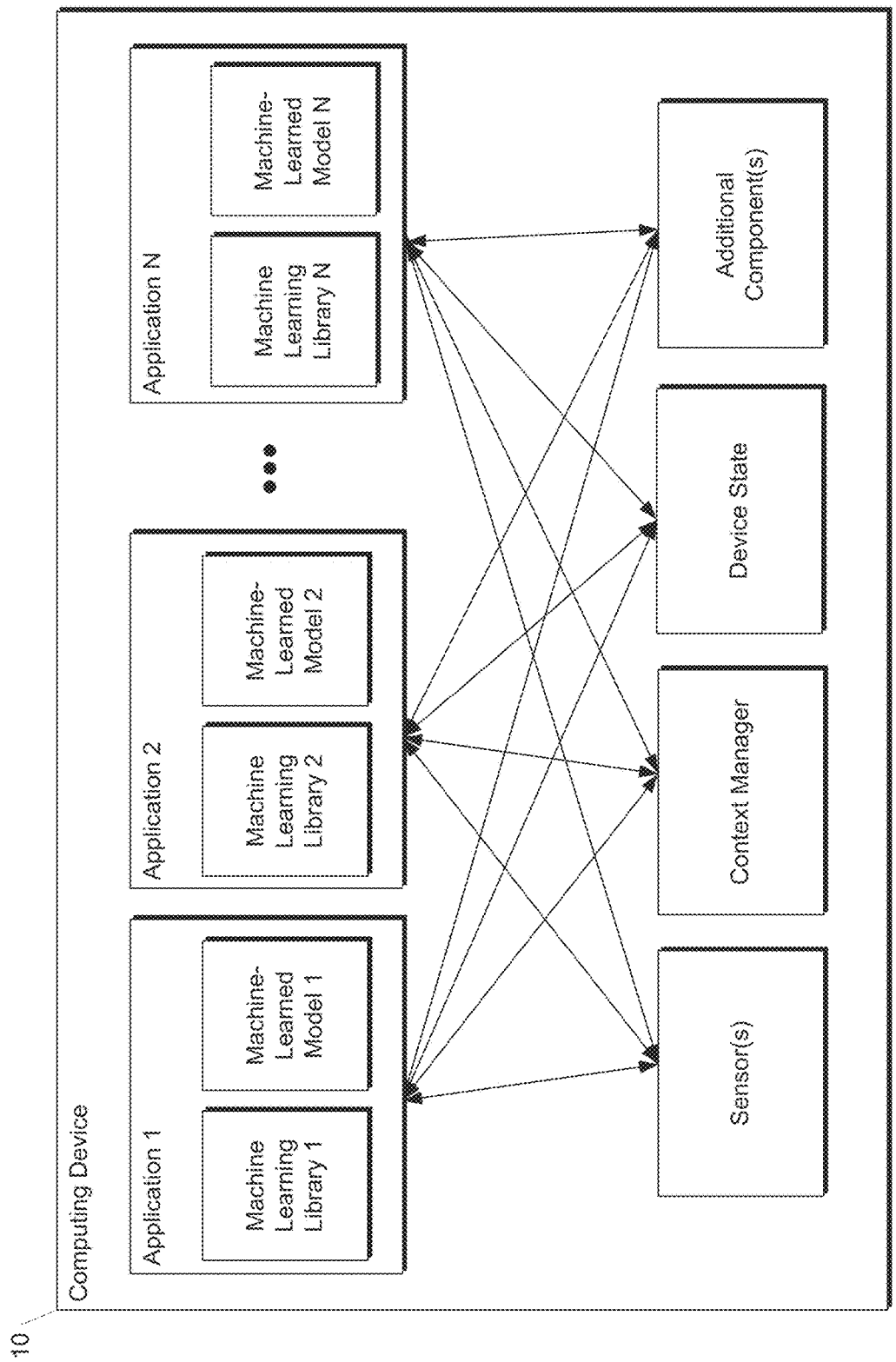
FIG. 1B depicts a block diagram of an example computing device that performs multi-class classification according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
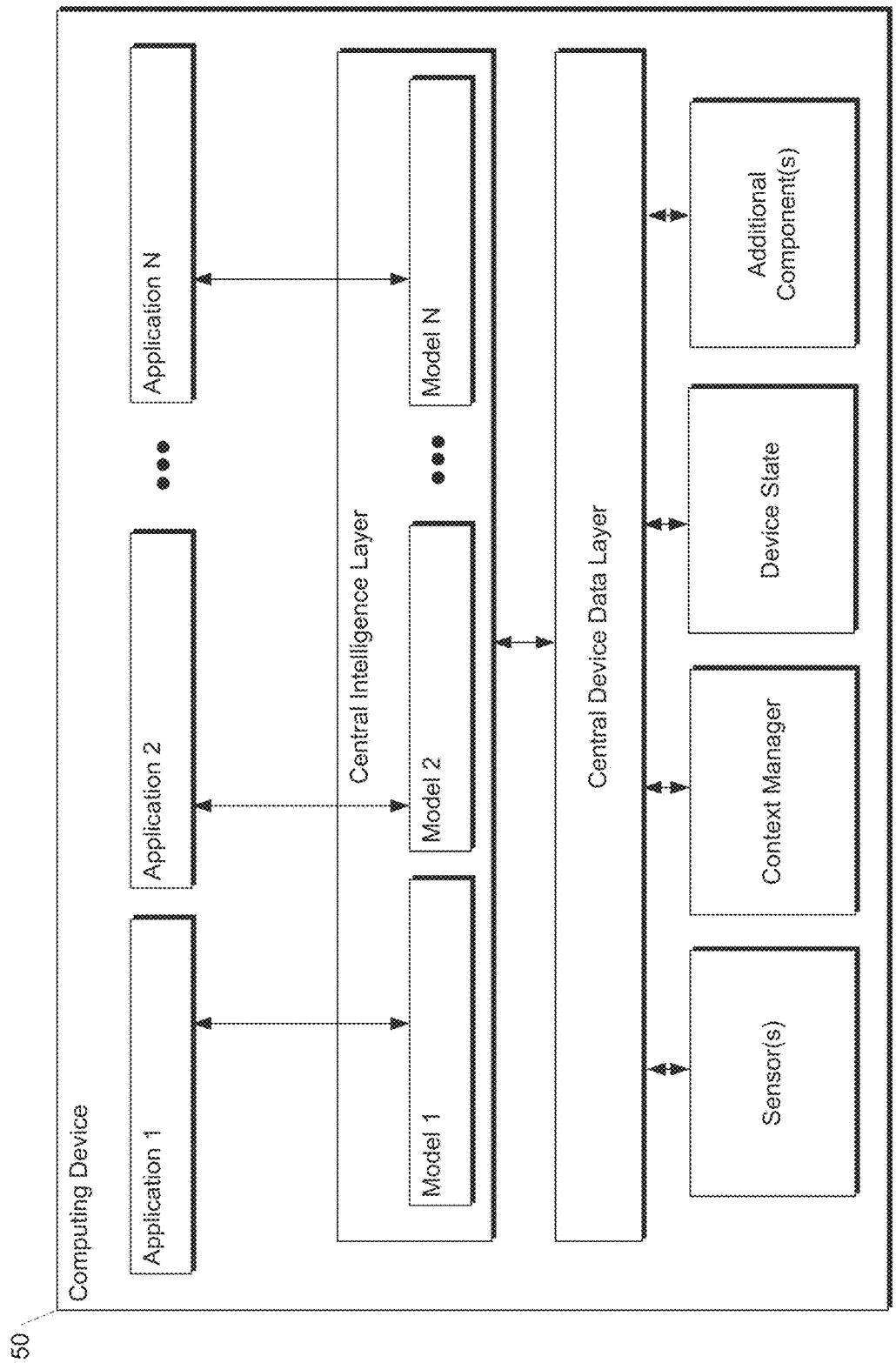
FIG. 1C depicts a block diagram of an example computing device that performs multi-class classification according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

FIG. 2 depicts a block diagram of an example classification model 200 according to example embodiments of the present disclosure. In some implementations, the classification model 200 is trained to receive a set of input data 204 descriptive of one or more input features to be classified and, as a result of receipt of the input data 204, provide output data 206 that is indicative of one or more classes associated with the one or more input features. Thus, in some implementations, the classification model 200 can include a classifier model 202 that is operable to predict a class associated with the one or more input features. Example classification tasks include but are not limited to natural language processing, image classification, and content recommendation. One of ordinary skill in the art will recognize that the systems and methods according to example aspects of the present disclosure can be extended to any suitable machine-learning task, such as any suitable multi-class classification task.

In some embodiments, the classification model 200 can be configured for natural language processing. For example, inputs associated with natural language processing tasks can include raw and/or processed linguistic data. For example, linguistic data can include audial and/or visual speech, such as audial and/or visual speech captured in a digital representation. For instance, one representation for the audial and/or visual speech can be a string of characters, such as ASCII characters and/or Unicode characters. For instance, in some embodiments, the string of characters can be tokenized into tokens. For instance, the tokens can include words, punctuation, syntactic markers, phrases, and/or any other suitable tokens. For instance, in some embodiments, the input features can include the tokens. As another example, the input features can include context features associated with the tokens. For instance, context features can include data related to characteristics of the tokens, such as length, placement, emphasis, or any other suitable context.

Outputs associated with natural language processing tasks can vary depending on the application. For instance, outputs can include classes that correspond to information about the tokens in the context of some larger portion of the linguistic data. For instance, classes can serve to capture semantic and/or syntactic relationships between words. For example, the classes can include vector representations of the input tokens.

In some embodiments, the machine-learned model can be configured for image classification. For example, inputs associated with image classification can include raw and/or processed image data. For instance, the image data can be input into a feature extraction algorithm to extract input features from the image data. Input features extracted from the image data can include, for example, corners, edges, characteristic regions, and/or any other suitable image features.

Outputs associated with image classification tasks can include, for example, subjects and/or groups of similar images. For example, based on the input features associated with an input image, the input image can be classified into a group with similar images, such as images having similar input features and understood generally to capture similar subjects. As another example, the model can identify the subject of the image as one or more of a plurality of classes, such as the most probable class or one or more closely probable classes.

In some embodiments, the machine learned model can be configured for content recommendation. Context recommendation systems can provide a user with recommended content from a large set of content that desirably matches the user's interests. For instance, a video streaming service may host a large number of videos having many different topics and/or creators and may wish to recommend some videos to the user that the user will be inclined to watch.

Inputs associated with content recommendation tasks can include, for example, user data and/or context data. A user can consent to allow collection of user data. For instance, the inputs can include a user embedding, such as a high-dimensionality vector representation associated with the user data and/or the context data. For instance, the user embedding can be a transformed embedding of a user, context pair or tuple. Additionally and/or alternatively, the inputs can include content data. For instance, the content data can include information about a corpus of content for recommendation to the user. For instance, the content data can include a content embedding, such as a vector representation of one or more content items.

Outputs associated with content recommendation tasks can include, for example, content items to be recommended to the user. For instance, the machine-learned model can predict one or more content items that are likely to be well-received by the user. For example, the model can classify the content according to a likelihood of being consumed by the user.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 3 depicts a block diagram of an example classification model 300 according to example embodiments of the present disclosure. The classification model 300 is similar to classification model 200 of FIG. 2 except that classification model 300 further includes a pre-classifier model 302. For instance, the pre-classifier model may be configured to condition the input data 204 in any suitable manner to be provided by data stream 304 to the classifier model 202.

Example Methods

Figure 6:
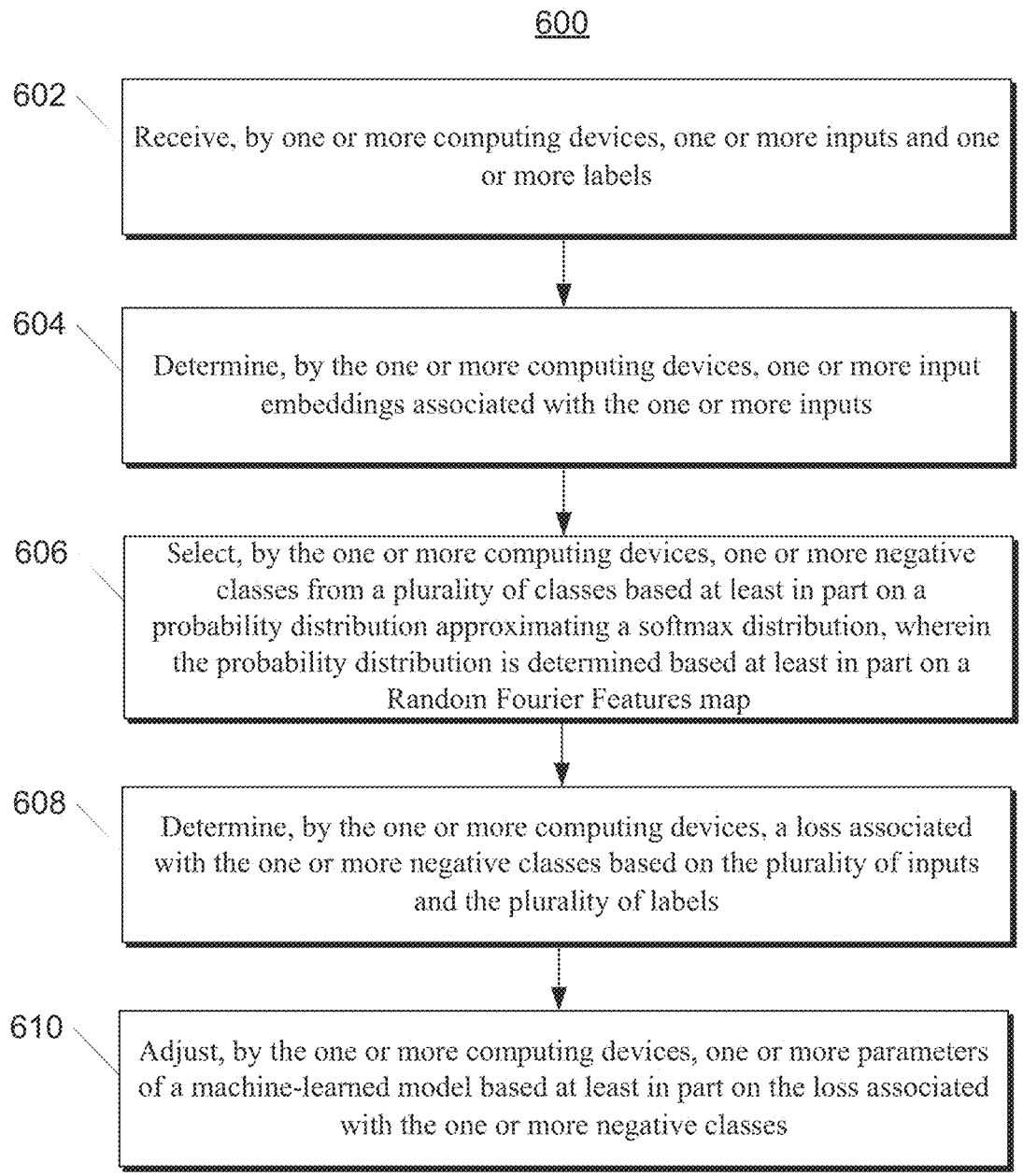
FIG. 6 depicts a flow chart diagram of an example method of training a machine-learned classification model according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can receive one or more inputs and one or more labels. For instance, the one or more inputs can include data capable of being classified into a set of classes. The one or more labels can include a correct class for the one or more inputs.

At 604, the computing system can determine one or more input embeddings associated with the one or more inputs. For example, the one or more input embeddings can include a vector representation of the one or more inputs, such as a feature vector.

At 606, the computing system can select (i.e., randomly select) one or more negative classes from a plurality of classes based at least in part on a probability distribution approximating a softmax distribution. For instance, the probability distribution can be determined based at least in part on a Random Fourier Features map. For instance, in some embodiments, the probability distribution can be a linearized Gaussian kernel that provides a uniform multiplicative approximation of an exponential kernel associated with the softmax distribution.

In some embodiments, the Random Fourier Features map can be defined as $$\phi_{\frac{1}{\sqrt{v}},D}(u) = \frac{1}{\sqrt{D}}\left[\cos(w_1^T u), \ldots, \cos(w_D^T u), \sin(w_1^T u), \ldots, \sin(w_D^T u)\right],$$

where D is a mapping dimension, v is a temperature parameter, and $w_1, \ldots, w_D \sim N(0, I/v)$. For instance, in some embodiments, the mapping dimension of the linearizable kernel can be less than a squared embedding dimension of the one or more input embeddings.

In some embodiments, the probability distribution can approximate $e^{\tau h^T c}$, where $\tau$ is a softmax temperature parameter, h is an input embedding of the one or more input embeddings, and c is a class embedding of the plurality of class embeddings. For instance, in some embodiments, the probability distribution can be $$q_i \propto \phi_{\frac{1}{\sqrt{v}},D}(c_i)^T \phi_{\frac{1}{\sqrt{v}},D}(h),$$

where h is an input embedding of the one or more input embeddings and $c_i$ is a class embedding of the plurality of class embeddings.

In some embodiments, the one or more negative classes can be selected based at least in part on a temperature parameter. In some embodiments, the temperature parameter can be determined based at least in part on the mapping dimension. For instance, in some embodiments, the temperature parameter can be less than a softmax temperature parameter, and the difference between the softmax temperature parameter and the temperature parameter can be inversely related to the mapping dimension.

In some embodiments, prior to selecting the one or more negative classes based at least in part on the probability distribution, the one or more input embeddings and the plurality of class embeddings can be normalized to obtain one or more normalized input embeddings and a plurality of normalized class embeddings, wherein the probability distribution is a function of the one or more normalized input embeddings and the plurality of normalized class embeddings.

At 608, the computing system can determine a loss associated with the one or more negative classes based on the one or more inputs and the one or more labels. For instance, the loss can be determined as a cross-entropy loss between the probability distribution and the one or more inputs and/or the one or more labels. For instance, in some embodiments, determining the loss can include evaluating a loss function to determine a loss based at least in part on the one or more negative classes, the one or more inputs, and the one or more labels. For instance, in some embodiments, evaluating the loss function can include performing, by the one or more computing devices, a structured orthogonal random feature technique.

At 610, the computing system can adjust one or more parameters of a machine-learned model based at least in part on the loss associated with the one or more negative classes. For instance, in some embodiments, the one or more parameters can be adjusted in a direction defined by a gradient of the loss. For instance, according to example aspects of the present disclosure, the gradient defined by the loss function can be unbiased with respect to a gradient defined by an underlying loss function associated with the softmax distribution. For instance, in some embodiments, the machine-learned model can be configured to perform a multi-class classification task. In some embodiments, the machine-learned model can be configured for natural language processing. In some embodiments, the machine-learned model can be configured for image classification. In some embodiments, the machine learned model can be configured for content recommendation. For instance, in some embodiments, the one or more inputs and/or one or more labels can be data types associated with the multi-class classification task.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of training a machine-learned model for classifying inputs into one or more classes of a plurality of classes, each of the plurality of classes having an associated class embedding in a plurality of class embeddings, the method comprising:
   receiving, by one or more computing devices, one or more inputs and one or more labels;
   determining, by the one or more computing devices, one or more input embeddings associated with the one or more inputs;
   normalizing, by the one or more computing devices using a vector norm, the one or more input embeddings to obtain one or more normalized input embeddings;
   normalizing, by the one or more computing devices using the vector norm, the plurality of class embeddings to obtain a plurality of normalized class embeddings;
   selecting, by the one or more computing devices, one or more negative classes from the plurality of classes based at least in part on a probability distribution approximating a softmax distribution, wherein the probability distribution comprises a linearized kernel determined based at least in part on a Random Fourier Features map, wherein the linearized kernel provides a uniform multiplicative approximation of an exponential kernel associated with the softmax distribution, and wherein the probability distribution is a function of the one or more normalized input embeddings and the plurality of normalized class embeddings;
   evaluating, by the one or more computing devices, a loss function to determine a loss based at least in part on the one or more negative classes, the one or more inputs, and the one or more labels; and
   adjusting, by the one or more computing devices, one or more parameters of the machine-learned model based at least in part on the loss, the one or more inputs, and the one or more labels.

2. The method of claim 1, wherein the vector norm is an $\ell_2$ norm.

3. The method of claim 1, wherein the loss comprises a cross entropy loss.

4. The method of claim 1, wherein a mapping dimension of the linearized kernel is less than a squared embedding dimension of the one or more input embeddings.

5. The method of claim 1, wherein the probability distribution approximates $e^{\tau h^T c}$, where $\tau$ is a softmax temperature parameter, h is an input embedding of the one or more input embeddings, and c is a class embedding of the plurality of class embeddings.

6. The method of claim 1, wherein the Random Fourier Features map is defined as $$\phi_{\frac{1}{\sqrt{v}},D}(u) = \frac{1}{\sqrt{D}}[\cos(w_1^T u), \ldots, \cos(w_D^T u), \sin(w_1^T u), \ldots, \sin(w_D^T u)],$$

where D is a mapping dimension, v is a temperature parameter, and $w_1, \ldots, w_D \sim N(0, I/v)$.

7. The method of claim 6, wherein the probability distribution comprises $$q_i \propto \phi_{\frac{1}{\sqrt{v}},D}(c_i)^T \phi_{\frac{1}{\sqrt{v}},D}(h),$$

where h is an input embedding of the one or more input embeddings and $c_i$ is a class embedding of the plurality of class embeddings.

8. The method of claim 6, wherein the temperature parameter is determined based at least in part on the mapping dimension.

9. The method of claim 8, wherein the temperature parameter is defined to be less than a softmax temperature parameter, and wherein a difference between the softmax temperature parameter and the temperature parameter is inversely related to the mapping dimension.

10. The method of claim 1, wherein evaluating, by the one or more computing devices, the loss function comprises performing, by the one or more computing devices, a structured orthogonal random feature technique.

11. The method of claim 1, wherein adjusting, by the one or more computing devices, the one or more parameters of the machine-learned model comprises adjusting, by the one or more computing devices, the one or more parameters in a direction opposite a gradient defined by the loss function.

12. The method of claim 11, wherein the gradient defined by the loss function is unbiased with respect to a gradient defined by an underlying loss function associated with the softmax distribution.

13. The method of claim 1, wherein selecting, by the one or more computing devices, the one or more negative classes comprises selecting, by the one or more computing device, the one or more negative classes based at least in part on a temperature parameter.

14. The method of claim 1, wherein the machine-learned model is configured for natural language processing.

15. The method of claim 1, wherein the machine-learned model is configured for image classification.

16. The method of claim 1, wherein the machine learned model is configured for content recommendation.

17. A computing system, comprising:
one or more processors; and
one or more non-transitory computer-readable media that collectively store:
a machine-learned model for multi-class classification, the machine-learned model configured to:
receive one or more input features; and
assign a class of a plurality of classes to each of the one or more input features; and
instructions that, when executed by the one or more processors, cause the computing system to perform operations, the operations comprising:
inputting the one or more input features into the machine-learned model; and
receiving the class as an output of the machine-learned model;
wherein the machine-learned model has been trained by:
receiving one or more training inputs and one or more labels;
computing one or more input embeddings associated with the one or more training inputs;
normalizing, by the one or more computing devices using a vector norm, the one or more input embeddings to obtain one or more normalized input embeddings;
normalizing, by the one or more computing devices using the vector norm, the plurality of class embeddings to obtain a plurality of normalized class embeddings;
selecting one or more negative classes from the plurality of classes based at least in part on a probability distribution approximating a softmax distribution, wherein the probability distribution comprises a linearized kernel determined based at least in part on a Random Fourier Features map, wherein the linearized kernel provides a uniform multiplicative approximation of an exponential kernel associated with the softmax distribution, and wherein the probability distribution is a function of the one or more normalized input embeddings and the plurality of normalized class embeddings;
determining, based on the one or more training inputs and the one or more labels, a loss associated with the one or more negative classes; and
adjusting one or more parameters of the machine-learned model based at least in part on the loss associated with the one or more negative classes.

18. The computing system of claim 17, wherein the vector norm is an $\ell_2$ norm.

19. The computing system of claim 17, wherein:
the Random Fourier Features map is defined as $$\phi_{\frac{1}{\sqrt{v}},D}(u) = \frac{1}{\sqrt{D}}[\cos(w_1^T u), \ldots, \cos(w_D^T u), \sin(w_1^T u), \ldots, \sin(w_D^T u)],$$

where D is a mapping dimension, $v$ is a temperature parameter, and $w_1, \ldots, w_D \sim N(0, I/v)$; and
wherein the probability distribution comprises $$q_i \propto \phi_{\frac{1}{\sqrt{v}},D}(c_i)^T \phi_{\frac{1}{\sqrt{v}},D}(h),$$

where h is an input embedding of the one or more input embeddings and $c_i$ is a class embedding of a plurality of class embeddings.

20. The computing system of claim 17, wherein the probability distribution approximates $e^{\tau h^T c}$, where $\tau$ is a softmax temperature parameter, h is an input embedding of the one or more input embeddings, and c is a class embedding of a plurality of class embeddings.

* * * * *